United States Patent [19]

Kozuki et al.

[11] 4,068,243
[45] Jan. 10, 1978

[54] PHOTOGRAPHIC CAMERA WITH AN EXTRINSIC COORDINATING SYSTEM

[75] Inventors: Susumu Kozuki, Yokohama; Toshikazu Ichiyanagi, Tokyo; Yoshiaki Watanabe, Fujisawa; Takashi Uchiyama, Yokohama; Akio Sunouchi, Tokyo, all of Japan

[73] Assignee: Canon Kabushiki Kaisha, Tokyo, Japan

[21] Appl. No.: 721,757

[22] Filed: Sept. 9, 1976

[30] Foreign Application Priority Data

Sept. 16, 1975    Japan .................................. 50-11965

[51] Int. Cl.² .............................................. G03B 7/08
[52] U.S. Cl. ................................................. 354/60 R
[58] Field of Search .................. 354/48, 50, 51, 60 R, 354/170, 171, 173, 234, 238, 267

[56] References Cited

U.S. PATENT DOCUMENTS

| | | | |
|---|---|---|---|
| 3,946,409 | 3/1976 | Toyoda | 354/171 X |
| 3,961,342 | 6/1976 | Maida | 354/238 X |

Primary Examiner—L. T. Hix
Assistant Examiner—M. L. Gellner
Attorney, Agent, or Firm—Toren, McGeady and Stanger

[57] ABSTRACT

An electrically operated extrinsic coordinating system for the light metering and exposure controlling circuits of a photographic camera, the camera also having incorporated therein an intrinsic coordinating system for those circuits, comprises first and second electronic switches connected in the respective power supply circuits for the light metering and exposure controlling circuits through respective interconnection channels to shunt the first and second switches of the intrinsic coordinating system, a delay circuit connected between the first and second electronic switches, and an operating switch arranged to be accessible from the outside of the camera and cooperative with the first electronic switch upon manual closure of the operating switch to actuate the light metering and exposure controlling circuits for the power supply in predetermined time-displaced relation to each other independently of the intrinsic coordinating system.

1 Claim, 2 Drawing Figures

PHOTOGRAPHIC CAMERA WITH AN EXTRINSIC COORDINATING SYSTEM

DETAILED DESCRIPTION OF THE INVENTION

This invention relates to photographic cameras having automatic exposure control of the type in which a light metering circuit is rendered operative prior to the actuation of an exposure controlling circuit, and more particularly to an extrinsic coordinating system for the light metering and exposure controlling circuits which system is manually actuable independently of an intrinsic coordinating system for those circuits.

It is known to provide an intrinsic coordinating system for light metering and exposure controlling means of a photographic camera constructed as including two mechanical separate switches arranged in respective power supply circuits for those means to be closed in sequence by a common actuator associated with a shutter release button. In this case, the closure of the first switch for the light metering means must preceed that of the exposure controlling means by a time lag predetermined by taking into account the delay of light response of the photosensitive element and the moment of inertia of the moving parts of the light metering and exposure controlling means. As far as is known, however, there has so far been made available no extrinsic coordinating system which enables the photographer to control the actuation of the light metering and exposure controlling means from the outside of the camera independently of the manipulation of the shutter release button. This situation may be encounted particularly when the camera is operated with a motor drive unit to make a continuous exposure of successive frames. It is awkward to actuate the automatic exposure control apparatus for power supply each time one frame exposure is to be made.

An object of the present invention is to provide a photographic camera of having an automatic exposure control circuit of the type described and provided with an extrinsic coordinating system which enables the photographer to actuate light metering and exposure controlling circuits for power supply thereto in sequence by a suitable time lag from the outside of the camera.

Another object of the invention is to provide an extrinsic coordinating system of the character described which is electronically operated and which is simple in construction.

The invention will be described in greater detail in the following specification, together with the drawings in which.

Figure 2:
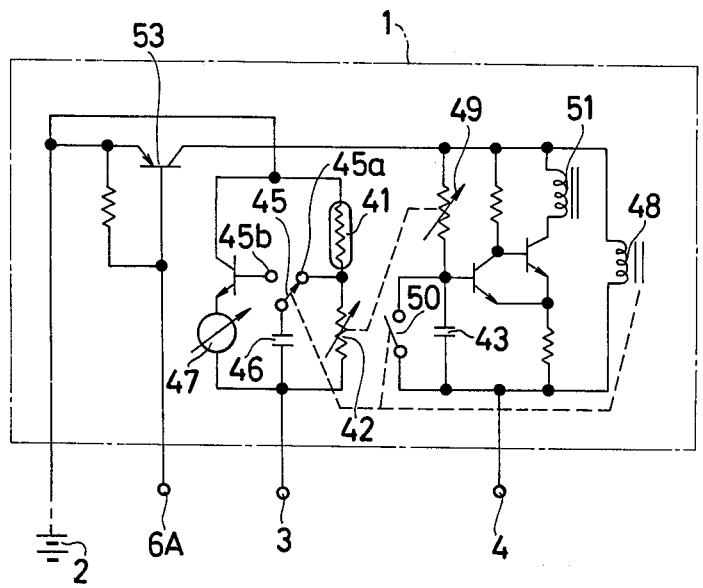
FIG. 2 is a circuit diagram showing the details of the automatic exposure control circuit of FIG. 1.

Referring first to FIG. 2, an example of the shutter preselection automatic diaphragm control circuit 1 is shown comprising a light metering circuit supplied with electrical energy from a power source or battery 2 through a pair of wires one of which is terminated at 3 and another wire which is connected to the positive terminal of battery 2, and a shutter control circuit supplied with electrically energy from battery 2 through a pair of wires one of which is terminated at 4 and another wire which is connected to the collector electrode of a switching transistor 53 with the emitter electrode connected to the positive terminal of battery 2 and with the base electrode connected to a terminal 6A.

The light metering circuit comprises a photosensitive element 41, a variable resistor 42 cooperative with both of a shutter dial and film speed dial and connected in series to photosensitive element 41, a storage condenser 46 connected as its one pole to the point 45a on connection between element 41 and variable resistor 42 through a single-pole double-throw memory switch 45, and an indicator 47 having a pointer cooperative with a scanning member of a diaphragm control mechanism, having a coil connected at one end to the emitter electrode of a transistor with its base electrode connected to the fixed contract 45b of memory switch 45.

The shutter control circuit comprises a variable resistor 49 cooperative with the shutter dial, a timing condenser 43 connected in series with variable resistor 49, an exposure start switch 50 connected across condenser 43, a transistorized trigger circuit having an input terminal connected to the output terminal of the RC timing circuit 49, 43 and having an output terminal connected to the solenoid of an electromagnet 51 for controlling the running-down movement of a rear shutter curtain not shown, and a camera release electromagnet connected between transistor 53 and terminal 4 for controlling the upward movement of a reflex mirror not shown, the running-down movement of a front shutter curtain not shown, the opening movement of start switch 50 and the turning-over operation of memory switch 45.

Figure 1:
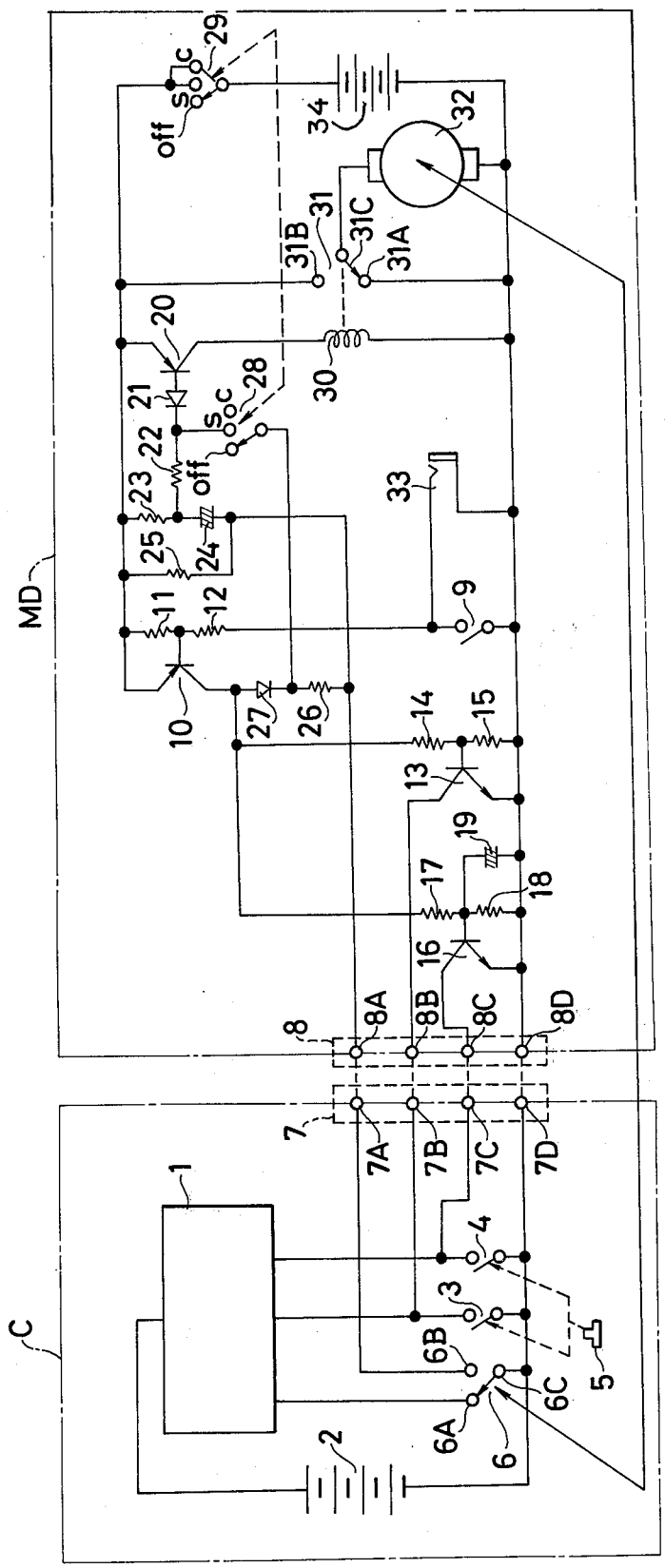
FIG. 1 is a circuit diagram of one embodiment of the extrinsic coordinating system according to the invention as established in the combination of a single reflex camera having a shutter preselection automatic exposure control circuit with a motor drive unit therefor and associated with control means for coordinating the shutter and film feeder of the camera.

Referring now to FIG. 1, there is shown a camera C associated with a motor drive unit MD, camera C including the automatic exposure control circuit 1, an intrinsic mechanical coordinating system, and a single-pole double-throw switch 6 constituting part of the control means for coordinating the shutter, film feeder of camera C, and the drive control circuit for an electric motor 32. The intrinsic coordinating system comprises first and second mechanical switches 3 and 4 arranged in respective power supply circuits for the light metering and shutter controlling circuits shown in FIG. 2 to be closed by a common actuator not shown when a shutter release button 5 is depressed to first and second strokes respectively. Switch 6 is so arranged that when the rear shutter curtain arrives the run down terminal position, the movable contact 6C is set from the fixed contact 6A to the fixed contact 6B, while when the film in the camera is advanced through the length of one frame along with the cocking of the shutter under the action of the energized electric motor 32 in unit MD, the movable contact 6C is set from 6B to 6A.

An extrinsic coordinating system of the invention as established in the combination of camera C with motor drive unit MD comprises a mechanical operating switch 9 arranged to be accessible from the outside of camera C housing, and in this instance, further from the outside of unit MD housing and connected in series to a voltage divider of resistors 11 and 12 and to an electrical energy source or battery 34 through a single-pole triple-throw switch 29, switch 9 also serving to permit only one film feeding stroke when unit MD is set in SINGLE FRAME position, a first electronic switch comprising a first pnp type transistor 10 having an emitter electrode connected through switch 29 to the positive terminal of battery 34 and having a base electrode connected to a point on connection between resistors 11 and 12, a second npn type transistor 13 having a base electrode connected through a resistor 14 to the collector electrode of first transistor 10 and a bias resistor 15 connected between the base and emitter of second transistor 13, a second electronic switch comprising a npn type transistor 16 with its base electrode connected through a resistor 17 to the collector electrode of transistor 10 and a bias resistor 18 connected between the base and emitter of transistor 16, and a delay circuit comprising the resistor 17 and a condenser 19 connected in series to each other. The collector electrode of transistor 13 is connected through paired interconnection terminals 7B and 8B which are arranged in a jack 7 and a plug 8 mounted on the housings of camera C and unit MD respectively to the fixed contact of the first power supply control switch 3 for the light metering circuit of FIG. 2, while the emitter electrode of transistor 13 and the movable contact of switch 3 are connected to each other through paired interconnection terminals 7D and 8D and to a common negative bus. The collector electrode of transistor 16 is connected through paired interconnection terminals 7C and 8C to the fixed contact of the second power supply control switch 4 for the shutter controlling circuit of FIG. 2, while the emitter electrode of transistor 16 and the movable contact of switch 4 are connected to each other through paired interconnection terminals 7D and 8D and to the negative bus.

The control circuit for coordinating the shutter and film feeder of camera C and the drive control circuit for motor 32 comprises a pnp type transistor 20 having an emitter electrode connected to the positive bus and having a collector electrode connected to a relay 30 cooperative with a motor control switch 31, and a diode 21 having a positive terminal connected to the base electrode of transistor 20, a resistor 22 connected at its one end to the negative terminal of diode 21, the opposite end of which is connected through a condenser 24 to paired interconnection terminals 7A and 8A and therefrom to the fixed contact 6B of switch 6. Resistors 23 and 25 are provided to discharge the condenser 24. For selection of the operating mode of motor 32 to make either of a single frame exposure and a successive set of frame exposures, there is provided a selector switch 28 associated with the switch 29 and having three fixed contacts, only one of which, namely, contact "S" representing SINGLE FRAME operation is connected to a point on connection between diode 21 and resistor 22. The single movable contact of switch 28 is connected to a point on connection between a diode 27 and a resistor 26 which are connected in series to each other and to either of the collector electrode of transistor 10 and the interconnection terminal 8A. The winding of motor 32 is connected at one end to the negative terminal of battery 32, the opposite end of which is connected to the movable contact 31C of motor control switch 31. 33 is a jack for the remote control of motor drive unit MD.

The operation of the circuit of FIG. 1 is as follows. Assuming that camera C is out of combination with motor drive unit MD and in the shutter-cocked position where switch 6 is set in "6A" position, when the shutter release button 5 is depressed to the first stroke, switch 3 is closed to render operative the light metering circuit of FIG. 2. At this time, the camera release electro-magnet 48 is not yet energized, so that switch 45 connects the photosensitive element 41 with storage condenser 46. Upon further depression of shutter release button 5 to the second stroke, switch 4 is closed to render operative the shutter control circuit and to energize electromagnet 48, causing the front shutter curtain to run down to the exposure aperture open position, causing start switch 50 to be closed, and causing switch 45 to be moved from 45a position to 45b position where the pointer of meter 47 is deflected to a position dependent upon the level of brightness of an object being photographed, thereby the size of diaphragm aperture is automatically controlled in a manner known in the art. In a time interval preselected in the shutter speed setting variable resistor 49 after the opening of start switch 50, the timing circuit 49, 43 produces an output which is then applied to the trigger circuit, thereupon the shutter electromagnet 51 is energized to terminate the exposure as the rear shutter curtain runs down in a manner known in the art.

Alternatively assuming that camera C is assembled with motor drive unit MD with jack 7 and plug 8 electrically connected to each other as shown in FIG. 1, and that unit MD is set in the normal position where switches 28 and 29 are in their "C" positions to make a successive set of frame exposures, when the switch 9 is manually closed to cause a flow of current through resistors 11 and 12 from battery 34 through closed switch 29, first and second transistors 10 and 13 of first electronic switch are rendered conducting so that the first mechanical switch 3 of the intrinsic coordinating system in camera C is short-circuited to actuate the light metering circuit of FIG. 2 for operation and the light metering result is transferred to and stored on condenser 46. At the termination of duration of a time interval from the actuation of the first electronic switch, the output voltage of delay circuit 17, 19 reaches a threshold level for the second electronic switch or transistor 16 so that the second mechanical switch 4 of the intrinsic coordinating system is short-circuited to actuate the shutter controlling circuit for power supply from battery 2 as switch 6 is set in "6A" position where transistor 53 is in the conducting state.

When the rear shutter curtain has run down to terminate a first frame exposure, switch 6 is set from "6A" position to "6B" position so that condenser 24 draws a sudden charging current from the base electrode of transistor 20 to energize relay 30. At this time, switch 31 is set from "31A" position to "31B" position where the power supply circuit for motor 32 is completed. As motor 32 is driven for rotation, when the film in camera C is advanced through the length of exactly one frame, switch 6 is returned to "6A" position where the base current path of transistor 20 is broken to de-energize relay 30, thereby switch 31 is set from "31B" position to "31A" position where the winding of motor 32 is short-circuited to effect a braking action on motor 32. During this time, condenser 24 is discharged through resistors 23 and 25. Such procedure repeats itself until the operating switch 9 is opened at the completion of the final frame exposure despite of the fact that the instrinsic coordinating system 3, 4 and 5 is not operated.

For SINGLE FRAME operation, switches 28 and 29 will be moved into their "S" position where the potential difference between the emitter of transistor 20 and the cathode of diode 21 is limited by diode 27 to a lower level than that necessary to cause conduction of transistor 20 when the operating switch 9 is closed. Upon closure of switch 9, the first and second electronic switches 10, 13 and 16 are actuated in sequence by a time lag dependent upon the delay circuit 17, 19 to initiate an exposure. At the completion of the exposure, switch 6 is automatically moved to "6B" position, so that when the operating switch 6 is opened, the potential at the base electrode of transistor 20 is dropped as it is connected through diode 21, switch 28, resistor 26 and switch 6 to the negative bus, thereby relay 30 is energized to drive motor 32 for rotation. At the end of one film feeding stroke, switch 6 is returned to "6A" position so that transistor 20 is rendered non-conducting.

The present invention has been described above in connection with a specific example thereof, but it will be understood that various changes and modifications may be made without departing from the invention. For example, instead of arranging the external coordinating system in the unit MD housing, it may be mounted in the camera C housing together with the remote control jack 33 and the operating switch 9. Further, the motor drive control circuit may be mounted in the camera C housing.

What is claimed is:

1. In a camera having a light metering circuit and an exposure controlling circuit responsive to the output of said light metering circuit for controlling actuation of means for determining exposure of photographic film, a coordinating system for those portions of said camera comprises;
    a. first electronic switch means connected in a power supply circuit for said light metering circuit,
    b. second electronic switch means connected in a power supply circuit for said exposure controlling circuit,
    c. electrical delay means connected between said first and said second electronic switch means, and
    d. an operating switch accessible from the outside of the housing of said camera and arranged upon closure to actuate said first electronic switch, whereby the actuation of said exposure controlling circuit is controlled in predetermined time-displaced relation to that of said light-metering circuit.

* * * * *

UNITED STATES PATENT OFFICE
CERTIFICATE OF CORRECTION

Patent No. 4068243                    Dated January 10, 1978

Inventor(s) Susumu Kozuki et al

It is certified that error appears in the above-identified patent and that said Letters Patent are hereby corrected as shown below:

In the heading of the patent [30] should read as follows:

-- [30] Foreign Application Priority Data

September 16, 1975   Japan.......50-111965--.

Signed and Sealed this

Sixth Day of June 1978

[SEAL]

Attest:

RUTH C. MASON
Attesting Officer

DONALD W. BANNER
Commissioner of Patents and Trademarks